A. C. MERCER.
SNAP FASTENER.
APPLICATION FILED SEPT. 18, 1919.
1,335,449.
Patented Mar. 30, 1920.
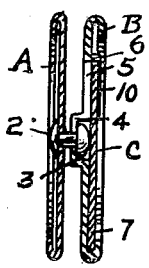
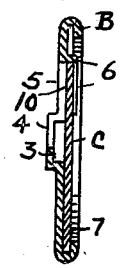
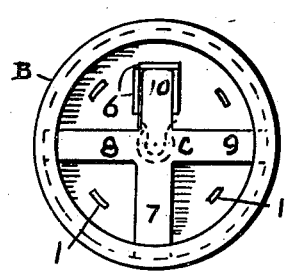
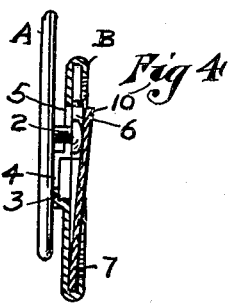
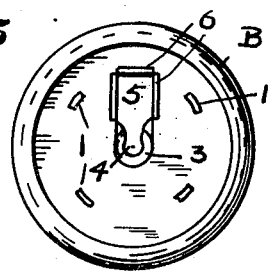
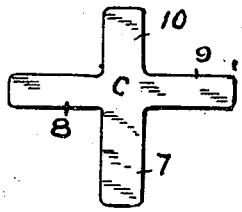
WITNESSES
INVENTOR

UNITED STATES PATENT OFFICE.

ALPHEUS C. MERCER, OF WILKINSBURG BOROUGH, PENNSYLVANIA.

SNAP-FASTENER.

1,335,449.  Specification of Letters Patent.  Patented Mar. 30, 1920.

Application filed September 18, 1919. Serial No. 324,561.

*To all whom it may concern:*

Be it known that I, ALPHEUS C. MERCER, citizen of the United States, and residing in the borough of Wilkinsburg, in the county of Allegheny and State of Pennsylvania, have invented or discovered new and useful Improvements in Snap-Fasteners, of which the following is a specification.

My invention consists of a new and improved snap fastener intended for detachably connecting together two articles or portions of the same article.

Thus, my fastener may be used as a substitute for buttons and button holes in garments, for the securing in place of automobile curtains, and for numerous other kindred purposes.

The object which I have in view is the provision of a new and improved fastener which will be efficient, easily fastened and unfastened, proof against accidental unfastening, and capable of being manufactured and sold at small cost.

Generally speaking, my improved fastener is of the following character. I provide two plates or members, a stud plate and a socket plate, which are sewed or otherwise attached to the portions of the garments, or other articles, to be fastened together. The stud plate has projecting, preferably axially, from its exposed face a stud with an enlarged head and a restricted neck. The socket plate is provided with a raised or struck out hollow boss or socket corresponding in position to the stud on the stud plate, and of sufficient interior size to accommodate the head of the stud, while a slot of sufficient width to accommodate the restricted neck of the stud extends from the center of said socket to the edge thereof where it merges into a second slot, alined with the first slot and of sufficient width to accommodate the head of said stud. A spring is mounted on the rear face of the socket plate which bears against the head of the stud during its engagement with and disengagement from the socket plate and also while the head of the stud is seated in the boss. Means are provided for guiding the stud while traversing the second named slot during the operation of engagement or disengagement and for holding the spring in proper alinement.

I have provided a novel form of such spring and also a novel method of mounting the same on the socket plate.

In the accompanying drawings, which are merely intended to illustrate the principles of my invention without limiting the scope thereof to the exact construction shown, Figure 1 is a diametric section showing the two plates engaged together; Fig. 2 is a similar section of the socket plate; Fig. 3 is a rear face view of the socket plate with the spring in place; Fig. 4 is a view similar to Fig. 1 but showing the two plates only partially engaged; Fig. 5 is a rear face view of the socket plate with the spring removed, and Fig. 6 is an elevation of the spring itself.

The following is a detailed description of the drawings.

A and B respectively represent the stud plate and the socket plate which may be conveniently stamped from metal. Their perimetral edges are preferably curved rearwardly and inwardly to form a finished edge, and to strengthen and protect the plates. The plates are preferably provided with slots or holes 1 for sewing or otherwise attaching the plates on garments, &c. I have shown the plates as circular, but it will be understood that any desired shape may be adopted.

The stud plate is provided on its outer face with a stud 2 having an enlarged and preferably flattened head and a restricted neck. I prefer to have the stud positioned at the axis or center of the plate, as shown.

The socket plate B is provided, in a location corresponding to that of the stud 2 on plate A, and therefore preferably axially or centrally with a hollow raised or outwardly struck boss or socket 3 of sufficient interior capacity to receive the head of stud 2. The socket is preferably not internally rounded but the angles formed by its walls are rectangular and the angles of the stud head are also preferably rectangular to obtain a good engagement between the stud head and the socket. 4 is a slot, of sufficient width to accommodate the restricted neck of the stud 2, extending from the center or apex of the socket 3 down one side thereof to its edge where it merges into an alined slot 5, of sufficient width to accommodate the head of stud 2 and which extends a short distance toward the edge of the socket plate B.

The outer end and side edges of the slot 5 are provided with rearwardly extending guide flange 6.

The rear face of the socket plate is provided with a spring which I prefer to make cruciform as shown at C, the axis of the spring being preferably alined with and in the rear of the socket 3, while three of its limbs 7, 8 and 9 have their ends inserted in the turned over edge of the socket plate B, thus holding the spring C in place but permitting it to flex. The fourth limb 10 of the spring extends under the slot 5 within the flange 6 and is preferably too short to reach the edge of the socket plate and is therefore free.

The method of engaging the two plates A and B together is as follows. The plates are placed face to face but not in exact registration, the head of the stud 2 bearing through the slot 5 on the spring limb 10. By pressing the plates together the head of the stud 2 will pass through the slot 5 to the rear face of plate B and the stud plate A is then slid laterally into registration with the socket plate B, the restricted neck of the stud 2 traveling inwardly along the slot 5 entering and passing along the narrower slot 4 until the head of the stud enters and is seated in the interior of the socket 3 as the neck of the stud reaches the inner end of the slot 4. The spring C will flex sufficiently to permit the travel of the head of the stud into the socket and will resiliently but effectually hold the head of the stud seated snugly in said socket. To disengage the plates, the same are pressed firmly together to press back the spring, thus permitting the stud head to move rearwardly and laterally out of the socket while the neck of the stud will travel out through the slot 4 into the slot 5 when the plates are separated, the separation being assisted by the spring tending to throw the head of the stud out through the slot 5.

It is evident that by pressing the plates together and giving one plate a lateral push in relation to the other, they will snap into engagement, and likewise pressing the plates together and giving one a lateral push in relation to the other the plates will snap loose from each other. It is also evident that accidental disengagement of the plates is impossible.

The flange 6 serves to hold the head of the stud in proper alinement in engaging the plates together, so that the neck of the stud will enter the slot 4 without trouble, and also serves to keep the head of the stud properly alined as the plates are disengaged and limits its outward travel so that the spring will throw the stud out of the slot 5. These guides also serve to keep the limb 10 of the spring in the rear of the slot 5 and prevent its being thrown to one side where its function would be impaired or destroyed.

The fastener is inexpensive and simple in construction, contains no parts easily broken or impaired, is so convenient of operation that it may be almost termed automatic, and yet it is incapable of accidental disengagement.

What I desire to claim is:

1. A fastener of the character described which consists in a stud plate and a socket plate, the stud plate being provided with a projecting stud having an enlarged head and restricted neck, and the socket plate being provided with an outwardly convex socket of proper interior capacity to accommodate the head of the stud, a slot of sufficient width to accommodate the neck of the stud extending from the center of said socket to the edge thereof, a second slot of sufficient width to accommodate the head of said stud, and a rearwardly extending guide flange along the edge of said second slot, and a spring mounted on the rear face of the socket plate.

2. A fastener of the character described which consists in a stud plate and a socket plate, the stud plate being provided with a projecting stud having an enlarged head and a restricted neck, and the socket plate being provided with an outwardly convex socket of proper capacity to accommodate the head of said stud, a slot of sufficient width to accommodate the neck of said stud extending from the center of said socket to the edge thereof and a second slot of sufficient size to accommodate the head of said stud merging into said first slot, and a spring mounted on the rear of said socket plate, said spring being cruciform having three of its limbs secured to the edge of said socket plate while its fourth limb is free and extends in the rear of said slots.

3. A fastener of the character described which consists in a stud and a socket plate, the stud plate being provided with a projecting stud having an enlarged head and a restricted neck, and a socket plate being provided with an outwardly convex socket of proper capacity to accommodate the head of said stud, a slot of sufficient width to accommodate the neck of said stud extending from the center of said socket to the edge thereof, a second slot of sufficient width to accommodate the head of said stud merging into said first slot and a rearwardly extending guide flange along the edge of said second slot, and a spring mounted on the rear of said socket plate, said spring being cruciform having three of its limbs secured to the edge of said socket plate while its fourth limb is free and extends in the rear of said second slot within said flange.

Signed at Pittsburgh, Pa., this 26th day of July, 1919.

ALPHEUS C. MERCER.